United States Patent [19]

Craig et al.

[11] Patent Number: 5,108,764

[45] Date of Patent: Apr. 28, 1992

[54] PRODUCTION OF CRACKERS WITH REDUCED OR NO ADDED FAT

[75] Inventors: Stuart A. S. Craig, Morristown; Paul R. Mathewson, Whippany; Michael S. Otterburn, Randolph; Louise Slade; Harry Levine, both of Morris Plains; Randall T. Deihl, Bedminster; Lisa R. Beehler, Morristown; Patricia Verduin, Glenrock; Anna M. Magliacano, Morristown, all of N.J.

[73] Assignee: Nabisco Brands, Inc., Parsippany, N.J.

[21] Appl. No.: 578,794

[22] Filed: Sep. 7, 1990

[51] Int. Cl.$^5$ ............................................. A21D 8/04
[52] U.S. Cl. ........................................ 426/18; 426/21
[58] Field of Search ................................. 426/18, 20

[56] References Cited

U.S. PATENT DOCUMENTS

| | | |
|---|---|---|
| 58,644 | 10/1866 | Holmes . |
| 882,006 | 3/1908 | Johnson . |
| 1,633,872 | 6/1927 | Rippey . |
| 2,144,720 | 1/1939 | Gibson . |
| 2,821,501 | 1/1958 | Simpson . |
| 3,281,249 | 10/1966 | Miyanoto . |
| 3,512,992 | 5/1970 | Cooke et al. . |
| 3,860,735 | 1/1975 | Hoshino . |
| 3,937,852 | 2/1976 | Wolf . |
| 3,982,032 | 9/1976 | Koizumi . |
| 4,353,926 | 10/1982 | Sugihara . |
| 4,595,596 | 6/1986 | Fazzolare et al. . |
| 4,761,296 | 8/1988 | Fazzolare et al. . |
| 4,990,343 | 2/1991 | Haarasilta et al. ................. 426/10 |

FOREIGN PATENT DOCUMENTS

| | | |
|---|---|---|
| 527576 | 6/1956 | Canada . |
| 603953 | 8/1960 | Canada . |
| 927826 | 6/1973 | Canada . |
| 0180952A2 | 5/1986 | European Pat. Off. . |
| 0286723A1 | 10/1988 | European Pat. Off. . |
| 0338787A2 | 10/1989 | European Pat. Off. . |
| 0368015A1 | 5/1990 | European Pat. Off. . |
| 2227368 | 10/1974 | Fed. Rep. of Germany . |
| 2800603 | 8/1978 | Fed. Rep. of Germany . |
| 37830 | 11/1970 | Japan . |
| 141297 | 9/1982 | Japan . |
| 293346 | 12/1986 | Japan . |
| 1322903 | 10/1973 | United Kingdom . |
| 2150933 | 7/1985 | United Kingdom . |

OTHER PUBLICATIONS

Von Loesecke, Harry W., *Outlines of Food Technology*, (Reinhold Publishing Company, New York, 1942), pp. 266-267.

Maltz, Samuel A., *Snack Food Technology*, (The AVI Publishing Company, Inc., Westport, Conn., 1976), pp. 150-156.

Heppner, Walter A. "The Fundamentals of Cracker Production", *The Baker's Digest*, Apr. 1959, pp. 68-70, 85-86.

Gaines et al., "Effects of Selected Enzymes on Cookie Spread and Cookie Dough Consistency" *Cereal Chemistry*, vol. 66, No. 2, 1989, pp. 73-78.

Bruemmer, G. M. "Baking Components" *Brot und Gebäck*, vol. 25, No. 11, (Nov. 1971), pp. 217-220.

Chemical Abstracts 98049g, vol. 76, 1972, "Baking Components", Bruemer, J. M.

Wieg, A. J. "Enzymic Treatment of Wastewaters From the Wheat Starch Industry" Starch/Stärke, vol. 36, No. 4 (1984), pp. 135-140.

Chemical Abstracts 100:214980b, vol. 100, 1984, "Enzymic Treatment of Wastewaters from the Wheat Starch Industry". Wieg, A. J.

Boshuk, W. "Distribution of Water in Dough and Bread", *Baker's Digest*, vol. 40, No. 5 (Oct. 1966), pp. 38-40.

(List continued on next page.)

*Primary Examiner*—Joseph Golian

[57] ABSTRACT

The added fat or shortening content of baked goods such as fermented and chemically leavened crackers is reduced while retaining: 1) a tender, non-brittle shelf stable texture, and 2) dough machinability. The fat or shortening is replaced by water and an enzyme composition having activities for hydrolyzing non-cellulosic cell wall polysaccharides. The amount of water and the enzymatic treatment are such so as to avoid excessive starch gelatinization which is deleterious to texture.

30 Claims, 7 Drawing Sheets

OTHER PUBLICATIONS

Medcalf et al., "Comparison of Chemical Composition and Properties Between Hard Red Spring and Durum Wheat Endosperm Pentosans", North Dakota State University, Fargo, Journal Series No. 131, Apr. 1967.

Medcalf et al., "Structural Characterization of a Pentosan from the Water Insoluble Portion of Durum Wheat Endosperm", North Dakota State University, Fargo, Journal Series No. 130, Nov. 1968.

Simpson, F. J., "Microbial Pentosanases I. A Survey of Microorganisms for the Production of Enzymes that Attack the Pentosans of Wheat Flour", *Canadian Journal of Microbiology*, vol. 1, No. 2, (Oct. 1954), pp. 131-139.

Chemical Abstracts 90:82674t, vol. 90, 1979 "Determination of $\beta$-xylosidase activity in rye". Fretzdorff, Barbara.

Palmer et al. "Influence of Enzyme Distribution on Endosperm Breakdown (Modification) During Malting" *Journal of the American Society of Brewing Chemists*, Vol. 43, No. 1 (1985), pp. 17-28.

Chemical Abstracts 103:121753b, "Enzyme and Enzyme Composition Degrading Pentosans", Gehungara, Adil.

Jankiewicz et al., "The Effect of Soluble Penstosans Isolated From Rye Grain on Staling of Bread", *Food Chemistry*, vol. 25, (1987), pp. 241-249.

Kulp, K. "Enzymolysis of Pentosans of Wheat Flour", *Cereal Chemistry*, vol. 45, No. 4 (Jul. 1968), pp. 339-350.

Drews, E. "Amylograms with Respect to Some Quality Criteria of Rye and its Mill Products" *Brot und Gebäck*, vol. 23, No. 9 (1969), pp. 165-170.

Chemical Abstracts 65520a "Amylograms with Respect to Some Quality Criteria of Rye and its Mill Products", Drews, E.

Botsch, A. "Possibilities for Utilization of New Enzymic Baking Additives", *Brot und Gebäck*, vol. 23, No. 10 (1969), pp. 202-203.

Chemical Abstracts 120153k "Possibilities for Utilization of New Enzymic Baking Additives", Botsch, A.

Johansson et al. "Composition of Water-Soluble Pentosans in Wheat Flour and Doughs and the Effect of Pentosanases on Kneading During Dough Development", *Sveriges Utsäadesförenings, Tidskrift*, vol. 81 (1971), pp. 282-301.

Chemical Abstracts 117310r, vol. 75 (1971), pp. 140-141, "Compositions of Water-Soluble Pentosans in Wheat Flour and Doughs and the Effect of Pentosanases on Kneading During Dough Development" Johansson et al.

Weipert, D. "Rheology of Rye Dough" *Getreide, Mehl Brot*, vol. 26, No. 10 (1972), pp. 275-280.

Chemical Abstracts 56693f, vol. 78, 1973, "Rheology of Rye Dough", Weipert, D.

Chemical Abstracts 71839j, vol. 82, 1975 "Enzymes for Bakery Products" Krebs et al.

Tegge et al. "Enzymic Hydrolysis of Various Starches", *Starch/Stärke*, vol. 38, No. 10 (1986), pp. 329-335.

Chemical Abstracts 105:224503r, vol. 105, 1986, "Enzymic Hydrolosis of Various Starches", Tegge et al.

Atwell et al. "The Terminology and Methodology Associated with Basic Starch Phenomenon" *Cereal Foods World*, vol. 33, No. 3 (Mar. 1988), pp. 306-311.

Genencor advertisements and technical public relations literature, generated before Sep. 11, 1987, 7 pages.

PRODUCTION OF CRACKERS WITH REDUCED OR NO ADDED FAT

FIELD OF THE INVENTION

The present invention relates to the continuous production of low-fat content crackers.

BACKGROUND OF THE INVENTION

Lowering dietary fat is recommended. (For the sake of this discussion, "fat" is meant to be synonymous with both animal and vegetable fat and shortening.) In the preparation of baked goods fat lubricates and reduces viscosity of the dough, retards starch from swelling and from gelatinizing. It also provides flavor and tenderness to the final product. Methods for making low or fat-free (no added fat) baked goods must somehow compensate for the multiple functions of fat when reducing or eliminating fat.

Machinability is an important consideration in preparing crackers. U.S. Pat. No. 2,144,720 issued to Gibson on Jan. 24, 1939 for a complicated cracker device illustrates the obstacles dough will experience when being fashioned into a product. If a cracker dough is not machinable on a mass production basis, it loses its commercial utility. On a mass production basis, a cracker dough must be continuously sheetable, and in the case of fermented crackers it should also preferably be capable of being laminated upon itself. The baked product should be non-brittle so as to be transferrable between conveyer belts and packaging equipment without excessive breakage.

Water can be used to reduce viscosity and to provide adequate lubrication to the dough in the absence of fat but water cannot be used to provide tenderness to the final product. Fat-free crackers made only with water as the fat replacement are flinty and so absorptive as to cause unpleasant dryness in the mouth upon eating.

Japanese specification 61-293346, U.S. Pat. No. 3,982,032 Koizumi and U.S. Pat. No. 3,860,735 of Hoshino disclose rice crackers apparently made without fat or shortening. German specification 28 00 603 and Japanese specification 45 37830 disclose rye crackers and Japanese specification 45 37830 also discloses a cracker all apparently made without added fat or shortening. There are products which do not require fat in their preparation but the invention is not concerned with such things. The problem facing the inventors is how to replace fat in methods ordinarily requiring fat and still maintain a quality product while continuously producing it on a mass production scale.

There are many protocols for baked goods which require fat. Holmes describes the use of lard in his cream cracker in U.S. Pat. No. 58,644 issued in 1866. Johnson describes adding oil to his cracker while it is hot in the oven in U.S. Pat. No. 882,006 issued in 1908. Rippey describes using coconut oil in his cracker in U.S. Pat. No. 1,633,872 issued in 1927. The pharmaceutical wafers of Schneiderworth, designed for weight loss, have shortening as described in Canadian Patent 526,576 issued in 1956. Wolf describes a compressed cracker which has oil in U.S. Pat. No. 3,937,852 issued Feb. 10, 1976. The soda crackers of Sugihara have shortening as described in U.S. Pat. No. 4,353,926 issued Oct. 12, 1982. The low sodium crackers and cookies of Arciszewski et al. use shortening as described in European application 0286723 published Oct. 19, 1988. von Loesecke, Harry, W. *Outlines of Food Technology*, (Reinhold Publishing Company, New York, 1942) pp. 266-267 discloses formulas for biscuits and crackers requiring lard or shortening. Matz, Samuel A. *Snack Food Technology*, (The AVI Publishing Company, Inc., Westport, Conn. 1976). pp. 150-156 discusses the use of shortening and fat in soda crackers. Heppner, Walter A. "The fundamentals of Cracker Production", *The Baker's Digest*, April 1959, pp. 68-70 and 85-86, relates to a method for making a fermented cracker using fat.

Cooke et al. describe using pentosanase in a dough used to make bread in U.S. Pat. No. 3,512,992 issued May 19, 1970. In addition to pentosanase treatment, the method of Cooke et al. also requires shortening. Miyamoto uses amylase and protease in the manufacture of his crackers along with shortening as described in U.S. Pat. No. 3,281,249 issued Oct. 25, 1966. Fazzolare et al. describe using enzymes to relax gluten in the dough used to make crackers containing sunflower seeds as set out in U.S. Pat. No. 4,595,596 issued on Jun. 17, 1986 and as described in related U.S. Pat. No. 4,761,296 issued on Aug. 2, 1988. Fazzolare et al. also use shortening.

Gaines et al. "Effects of Selected Commercial Enzymes on Cookie Spread and Cookie Dough Consistency" *Cereal Chemistry*, vol. 66, no. 2, 1989, pp. 73-78, discloses the use of commercial-grade enzymes including cellulases in the production of cookies.

The relative effects on the viscosity of rye flour suspensions exhibited by various enzymes such as protease, pentosanase, and alpha-amylase is disclosed in Bruemmer, G. M. "Baking Components" *Brot and Geback*, vol. 25, No. 11, (November 1971), pp. 217,220 and in its *Chemical Abstract* no. 98049q, vol. 76, page 333 (1972). The use of α-amylase for liquefying starch is disclosed in European Patent Application 0 180 942 published May 14, 1986.

Simpson describes the use of pentosanase for the recovery of starch from gluten separations in U.S. Pat. No. 2,821,501 issued on Jan. 28, 1958. (Also, see Canadian Patent 603,953 issued Aug. 23, 1960.) Pentosanase has been used in the refining of starch as described in Japanese specification 57-141297 published Sep. 1, 1982. Pentosanase has been used to treat wastewaters from the wheat starch industry. (Wieg, A. J. "Enzymic treatment of wastewaters from the wheat starch industry" *Starch/Staerke*, Vol. 36, No. 4. (1984), pp. 135-140.)

The substrate for pentosanase in doughs is comprised of pentosans which are polysaccharides. Pentosans can comprise as much as 1-2% by weight of flour yet up to 23.4% of water distribution in dough can be associated with the pentosans. (Bushuk, W. "Distribution of Water in Dough and Bread", *Baker's Digest*, Vol. 40, No. 5, (October 1966), pp. 38-40.) Pentosans have been characterized as comprising two fractions, soluble and insoluble. (Medcalf et al. "Comparison of Chemical Composition and Properties between Hard Red Spring and Durum Wheat Endosperm Pentosans", North Dakota State University, Fargo, Journal Series No. 131, April 1967; Medcalf et al. "Structural Characterization of a Pentosan from the Water Insoluble Portion of Duram Wheat Endosperm" North Dakota State University, Fargo, Journal Series No. 130, November 1968.)

Microbial pentosanases are discussed in Simpson, F. J. "Microbial Pentosanases I. A Survey of Microorganisms for the Production of Enzymes that Attack the Pentosans of Wheat Flour", *Canadian Journal of Microbiology*, Vol. 1, No. 2, (October 1954), pp. 131-139.

Measuring pentosanase activity is discussed in Fretzdorff, B. "Determination of β-xylosidase activity in rye" *Z. Lebenson Unters Forsch*, Vol. 167, No. 6, (1978), pp. 414-418. Characterization of pentosanase as a hydrolytic enzyme produced in germinating barley occurs in Palmer et al. "Influence of Enzyme Distribution on Endosperm Breakdown (Modification during Malting)", *Journal of the American Society of Brewing Chemists*, Vol. 43, No. 1, 1985, pp. 17-28. Fungal, thermostable pentosanases are discussed in U.K. Patent Application 2 150 933 published Jul. 10, 1985.

Casier describes using a preparation of pentosans as an additive to soften flours and enable bread making from rice flours and the like. (British Patent 1,332,903 issued published Oct. 10, 1973.) Casier found that by the addition of rye pentosans, bread volume would be increased and shelf life extended. Support for Casier is found in the article of Jankiewicz et al. "The Effect of Soluble Pentosans Isolated from Rye Grain on Staling of Bread", *Food Chemistry*, Vol. 25, (1987), pp. 241-249.

Pentosans comprise several fractions having different functional properties. Rendering insoluble pentosans soluble with enzymes improved the baking quality of the fraction to that of prime starch. (Kulp, K. "Enzymolysis of Pentosans of Wheat Flour", *Cereal Chemistry*, Volume 45, No. 4, (July, 1968), pp. 339-350.) Soluble pentosans have been reported to affect dough viscosity. (Drews, E. "Amylograms with respect to some quality criteria of rye and its mill products", *Brot and Gëback*, Vol. 23, No. 9, (1969), pp. 165-170.)

Pentosanases have been reported to reduce viscosity, improve volume, lightness and crumb quality of both rye and wheat breads. (Botsch, A. "Possibilities for Utilization of New Enzymic Baking Additives", *Brot and Gëback*, Vol. 23, No. 10, (1969), pp. 202-203.) Pentosanase activity has been reported to improve softness of bread and resistance to staling. (U.S. Pat. No. 3,512,992 issued to Cooke et al. on May 19, 1970.)

There are problems with using too much pentosanase which can reduce volume of bread where optimal amounts increase volume of bread. (Johansson et al. "Composition of Water-soluble Pentosans in Wheat Flour and Doughs and the Effect of Pentosanases on Kneading during Dough Development", *Sveriges Utsädesförenings Tidskrift*, Vol. 81, (1971), pp. 282-301.) A study of the effects of amylases, proteases, cellulases, pentosanases and pectinase on rye flour concluded that the pentosanases and proteases lowered dough viscosity the most. However, five fold increases in enzymes were no more effective than a single dose. (Weipert, D. "Rheology of Rye Dough", *Getreide, Mehl Brot*, Vol. 26, No. 10, (1972), pp. 275-280.)

Casier mentions the use of pentosanase as an adjuvant for promoting breadmaking in Brevet Canadian 927,826 issued Jun. 5, 1973. Krebs et al. discuss improvements in the crush of bread by pentosanase in Offenlegungsschrift 2,227,368 published Oct. 17, 1974. One report mentions that pentosanases do not affect viscosity of wheat starch hydrolysates. (Tegge et al. "Enzymic Hydrolysis of Various Starches", *Starch/Staerke*, Vol. 38, No. 10, (1986), pp. 329-335.)

Cracker making involves different problems from that of bread making. For example, in bread making gelation of starch and maintaining moisture in the bread are objectives. When bread goes stale it becomes hard. When crackers go stale they become soft. The inventors have found that in preparing crackers without the addition of fat, a machineable cracker dough using only water as the fat replacement provides a product with inferior texture.

A major source of the textural problem is believed to be excessive gelatinization of starch in the cracker made with extra water without adding fat. Indeed, the inventors have discovered that excessive gelatinization of starch during baking makes the cracker flinty and very moisture absorbent. Retention of water in the cracker dough during baking causes excessive gelatinization and the resultant inferior cracker. Thus, when preparing crackers, unlike preparing bread, starch gelatinization is to be minimized.

A wet preparation of flour type products from cereal grains without gelatinizing the starch is described in U.S. Pat. No. 4,435,429 issued to Burrows et al. on Mar. 6, 1984. Note that Burrows et al. are not concerned with minimizing gelatinization of starch in final products, rather the preparation of oat flour is the goal.

In the present invention, the added fat or shortening content of a mass produced cracker reduced using water and an enzyme composition. Dough machinability is retained and excessive starch gelatinization is avoided in the cracker even though the added fat level is substantially reduced or completely eliminated and water levels are increased on a flour basis. The enzyme composition is used to minimize starch gelatinization during baking by decreasing the amount of water used to form a machinable no-fat or reduced fat dough and by increasing the dough's ability to release water faster. Less water present during baking translates to less gelatinization of starch. The reduced fat or no-added fat crackers of the present invention exhibit a shelf-stable, tender, non-brittle texture over extended periods of time.

SUMMARY OF THE INVENTION

In the present invention, the added fat or shortening content of a cracker is reduced while substantially maintaining its desireable texture. Both enzymatic treatment by an enzyme composition that hydrolyzes non-cellulosic cell wall polysaccharides and the amount of water used to form a dough are such so as to avoid excessive starch gelatinization upon baking. Avoiding excessive starch gelatinization results in a tender, non-brittle texture. The desirable texture lasts for extended periods of time, for example at least two months, preferably at least six months, in closed packaging.

Perferably, minimal amounts of water are used to form the dough so as to reduce starch gelatinization. In embodiments of the present invention, the water content of the dough is the same or increased: a) without substantially decreasing the viscosity or consistency of the dough, and b) without substantially increasing the gelatinization of the starch compared to the cracker dough containing unreplaced shortening or fat. The amount of water may be increased up to about 17% by weight, preferably from about 5% to about 15% by weight, for example. The machinable, reduced fat or shortening content doughs of the present invention may have an LFRA of about 100 grams to about 1200 grams, preferably from about 400 to about 600 grams. Preferably, only so much enzyme is used to obtain a dough viscosity within the desired machinable range.

Enzymes which hydrolyze non-cellulosic cell wall polysaccharides which may be used include hemi-cellulases such as pentosanaces, beta-glucanases, and mixtures thereof. The enzyme may be acidic, alkaline or neutral and may be added in liquid or powdered form.

In the present invention, contact of the enzyme with concentrated leavening agents is preferably avoided to provide an environment which more consistently maximizes the enzyme's activity.

To eliminate fat in fermented crackers, a sponge is developed without fat and fermented. Doughing-up is usually where fat or shortening is added in preparing fermented crackers. Instead of fat or shortening, in a preferred embodiment a solution comprising pentosanase is added to the top of the sponge, followed by flour, followed by leavening agents. The material is then mixed. While viscosity reduction is very rapid, proofing may be from about 0.5 hours to about 4 hours. After proofing, the LFRA of the dough should preferably be about 100 grams to about 1200 grams, preferably from about 400 to about 600 grams. The dough is then continuously sheeted, laminated, cut into pieces and baked.

When fat has been eliminated from the preparation, rancidity can still be a problem. There is generally a small amount of naturally occurring unsaturated lipids in flour. An antioxidizing agent can be added to the preparation to protect the points of unsaturation from oxidizing and peroxide formation. Naturally occurring antioxidants BHT, BHA, TBHQ, or mixtures thereof may be used, for example, in an amount of about 2 to about 50 parts per million, based on the weight of the product to protect against rancidity of the native lipids.

To eliminate fat from unfermented crackers or chemically leavened crackers, the ingredients other than flour and the enzyme may be creamed, followed by mixing in the flour, followed by placing the enzyme on top of the flour. Proofing and viscosity reduction occurs and proofing may continue for about 0.5 hours to about 4 hours. The proofed machinable dough may have an LFRA value of about 100 to about 1200 grams, preferably from about 400 to about 600 grams. The proofed dough may then be continuously sheeted, laminated, cut, and baked. An antioxidizing agent may be added to protect against rancidity.

"6", "6A" and "7" are the only crackers made with no fat and no enzyme treatment. The remaining numbers represent crackers made with no fat with pentonase treatment. Cracker number 5 was made with about three times the amount of pentosanase used for the others.

Figure 5:
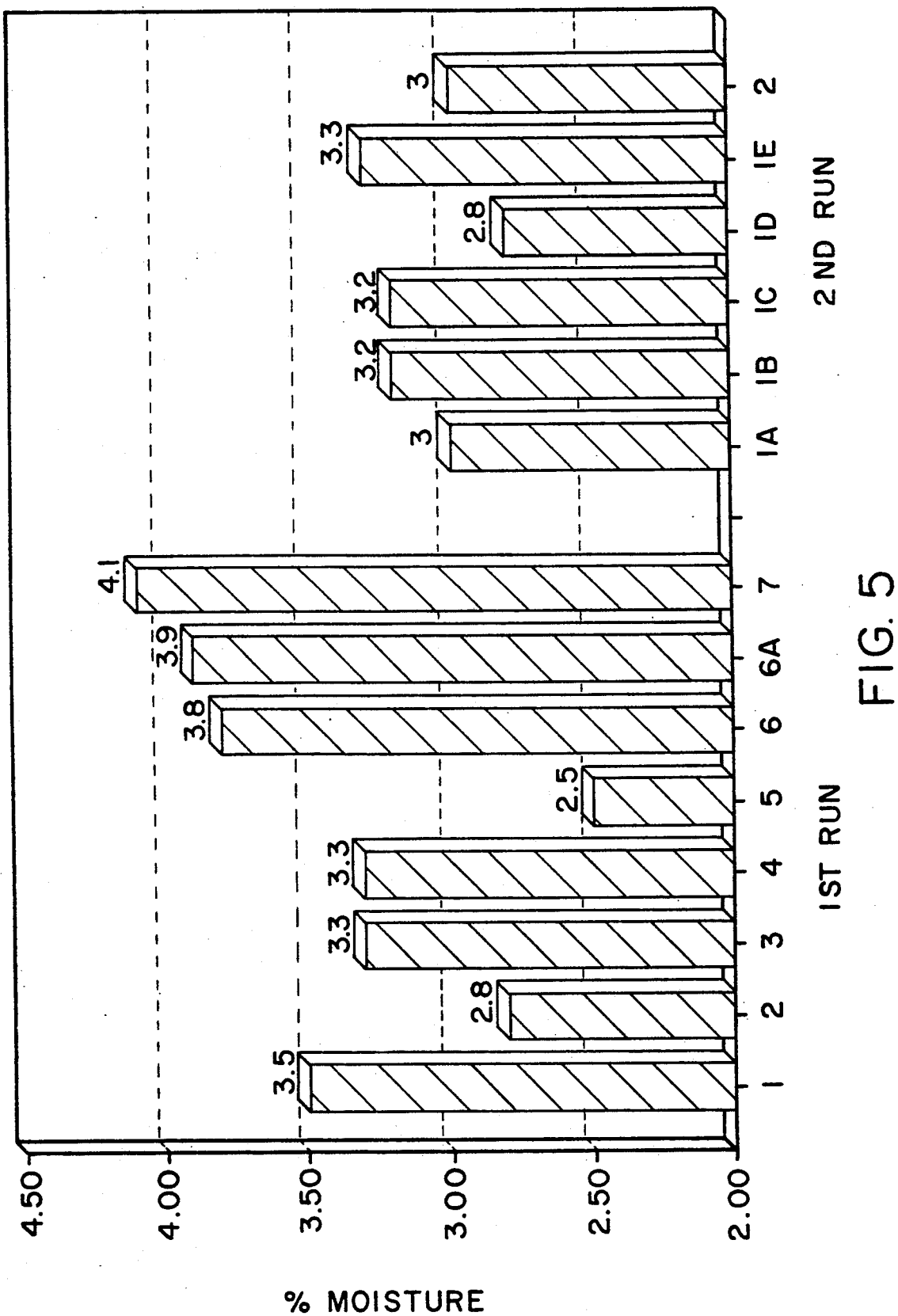
FIG. 5 is a graph showing results of an analysis of fermented cracker moistures for two different runs of protocols performed on consecutive days. "1" and "1A" are controls which are crackers made with fat.
Figure 6:
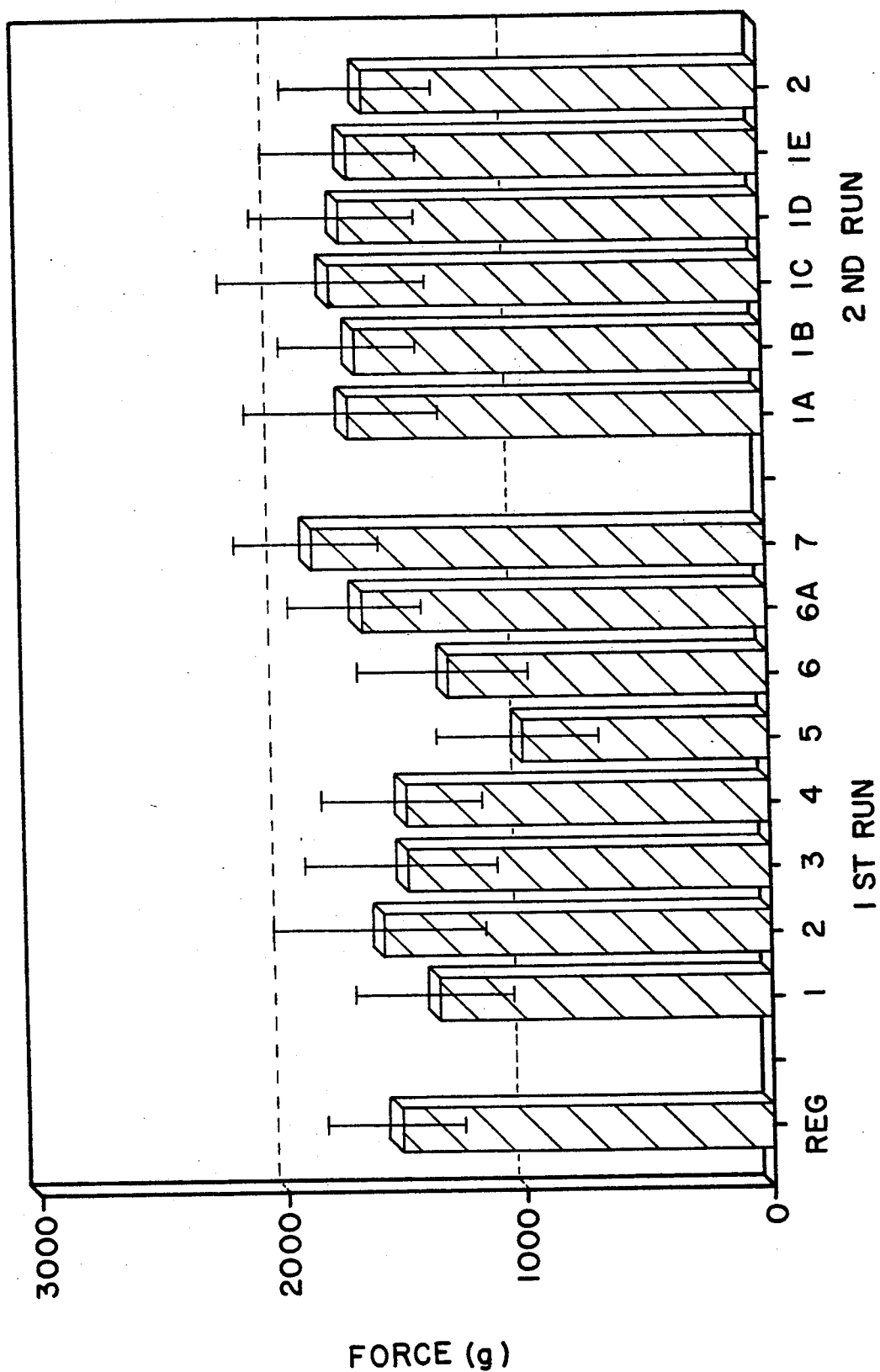

FIG. 6 is a graph showing the amount of force needed to snap the crackers of FIG. 5.

Figure 7A:
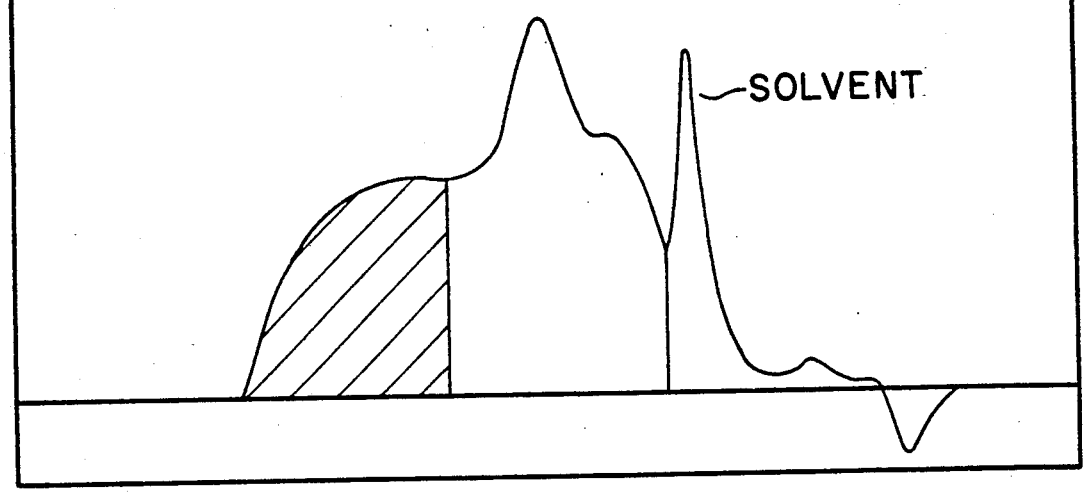
Figure 7B:
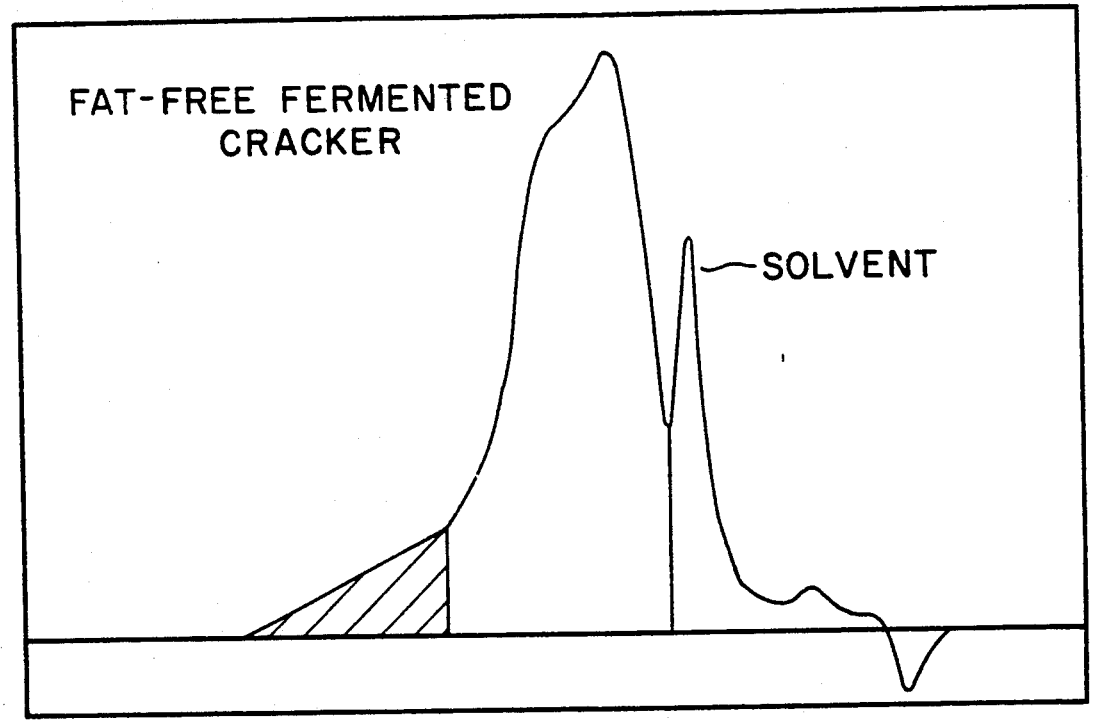

FIG. 7A and FIG. 7B are a comparison of two HPLC (High Performance Liquid Chromatography) chromatograms of pentosans from a regular fermented cracker and the inventive fat-free fermented cracker. The pentosans of the fat free cracker are shown to be reduced in molecular weight.

DETAILED DESCRIPTION OF THE INVENTION

Crackers made with water instead of fat are not tender. Indeed, they are flinty, hard and so absorbent within the mouth as to provide an unpleasant eating experience. Studies on such crackers reveal a difference in starch crystallinity or starch gelatinization between crackers made with fat and crackers made with water instead of fat. It has been discovered that the higher degree of starch gelatinization or lower amount of starch crystals in the fat-free crackers contributes to the lack of tenderness. The invention minimizes and lowers the amount of starch gelatinization in such fat-free crackers.

The invention is illustrated in cracker systems but crackers are not the only systems where the invention may be applied. As such, the invention is applicable to systems where it is desired to replace fat with water and obtain a tender product. Applicable systems necessarily must be farinaceous based and preferably grain flour based.

Replacing fat with water can render the cracker dough machinable. However, the presence of water during baking of the dough can affect the starch gelatinizing temperature. Gelatinized starch is highly absorbent and hard or brittle when moisture is removed. Crackers with too much gelatinized starch go stale or moist too quickly.

Ordinarily, fat protects starch granules from the deleterious affects of water during baking of the dough. Without fat surrounding the starch granules, water is absorbed into and swells the starch granules. The invention allows for minimizing water from in and around the starch during baking substantially before the starch melting temperature is reached. Minimization of water prior to melting elevates the starch melting temperature and thus minimizes starch gelatinization.

Altering the water binding non-cellulosic cell wall polysaccharides such as pentosans and/or beta-glucans in the dough environment is the goal of the enzymatic treatment. Pentosans, for example, hold a lot of water even though they amount to only a minor fraction of the dough. Hydrolyzing the pentosans, or other hemicellulases so the release water from the dough prior to reaching the starch gelatinization temperature during baking, lowers the amount of gelatinization of starch.

Figure 1:
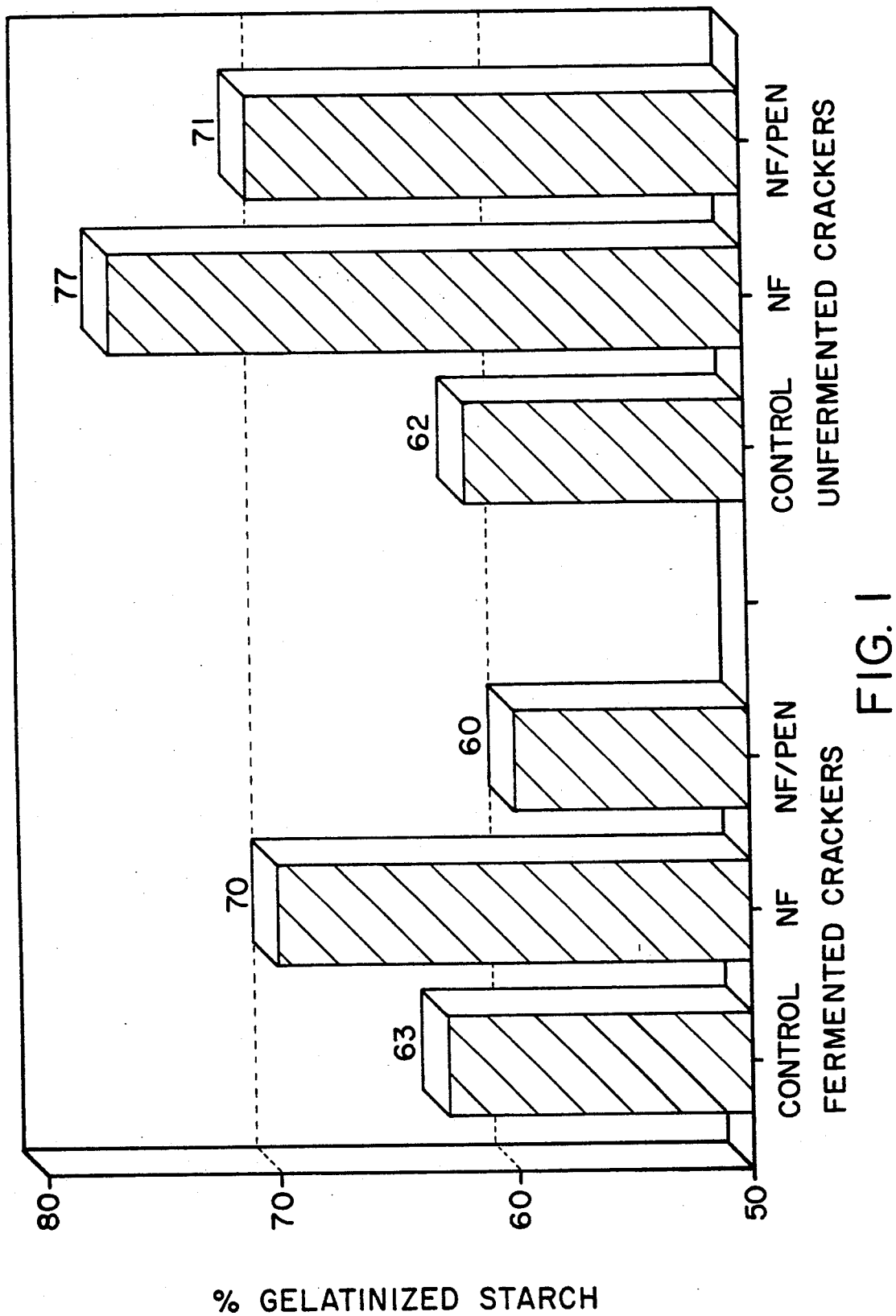
FIG. 1 is a graph showing two analyses of starch gelatinization in fermented and unfermented crackers. The controls involved the addition of fat in the preparation. "NF" means no fat and no enzyme treatment. "NF/Pen" means no fat with pentosanase treatment.
Figure 2:
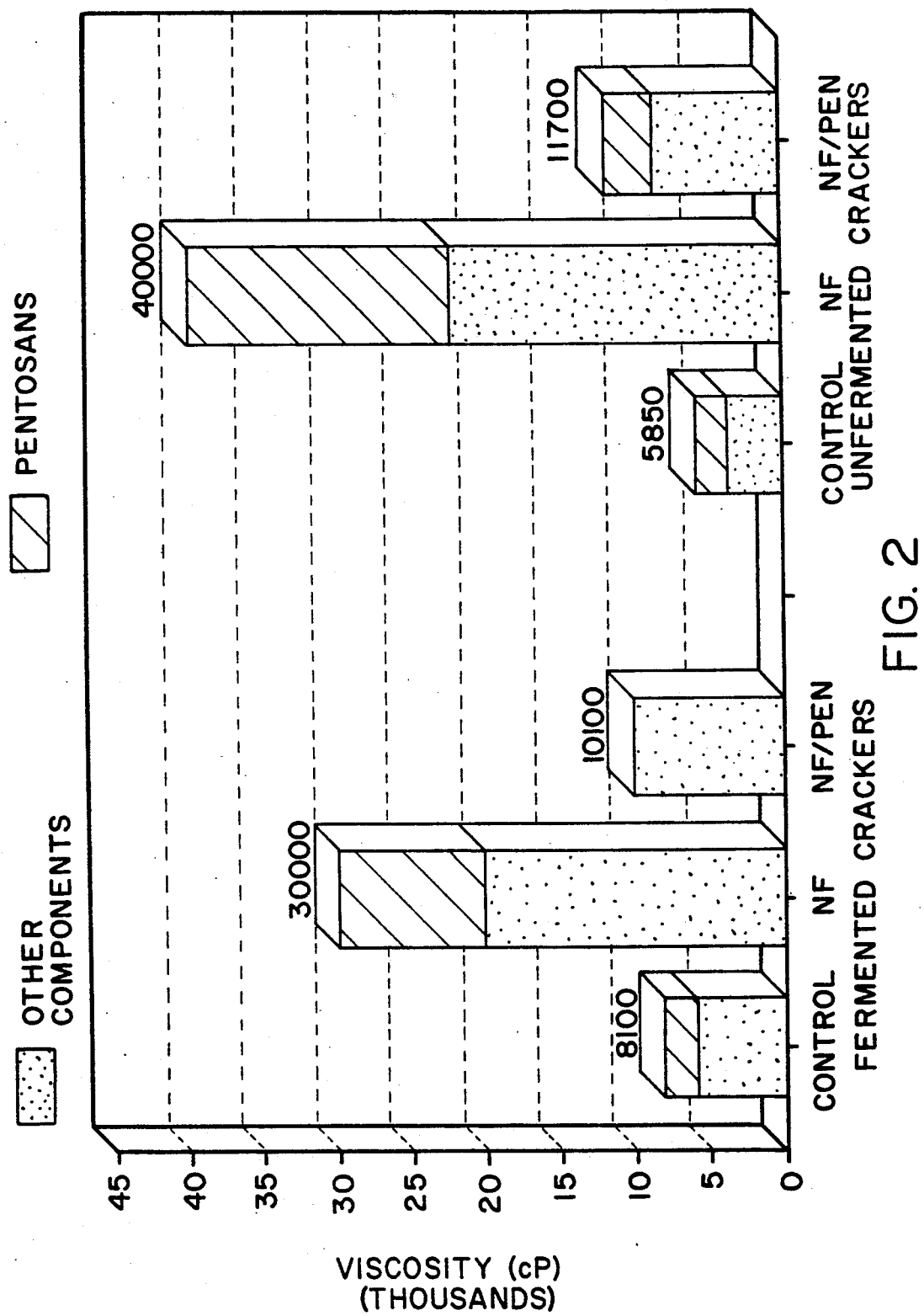
FIG. 2 is a graph which accompanies FIG. 1. The data is obtained from measuring the viscosity of slurries made from the crackers of figure one. No-fat, pentosanase treated crackers approach the values for the controls.

The trend of the data obtained from research investigating the problem of hard, excessively absorbent fat-free crackers is shown in FIG. 1. Measurement by differential scanning colorimetry of the degree of crystallinity remaining in starch after baking provides a view of the physical state of starch in the cracker. The loss of crystallinity is a key event in starch gelatinization and should correlate with the measured increase in slurry viscosity which is shown in FIG. 2. The data shows that there is a greater degree of gelatinization in NF crackers than in NF/Pen crackers. This can be largely attributed to the presence of too much additional water in the NF dough which lowers the gelatinization temperature of the starch, thereby increasing the amount of gelatinization. In addition, the absence of fat may allow for greater gelatinization and swelling. The NF/Pen crackers were significantly closer to the control, in terms of starch gelatinization, than were the NF crackers. As mentioned earlier, this extra water can lead to gelatinization at a lower temperature and a greater degree of gelatinization. Accompanying the lesser amount of starch gelatinization with the enzyme treated cracker is a tenderness approaching that of the control.

The data of FIG. 2 shows the contribution to cracker slurry (30.2% W/W) viscosity of pentosans and other components (starch, protein). The NF crackers had a much greater viscosity than the Control of NF/Pen crackers. Overall, the data shows that the physical state of the starch in NF/Pen crackers was closer to the Control than it was for the NF crackers.

Figure 3:
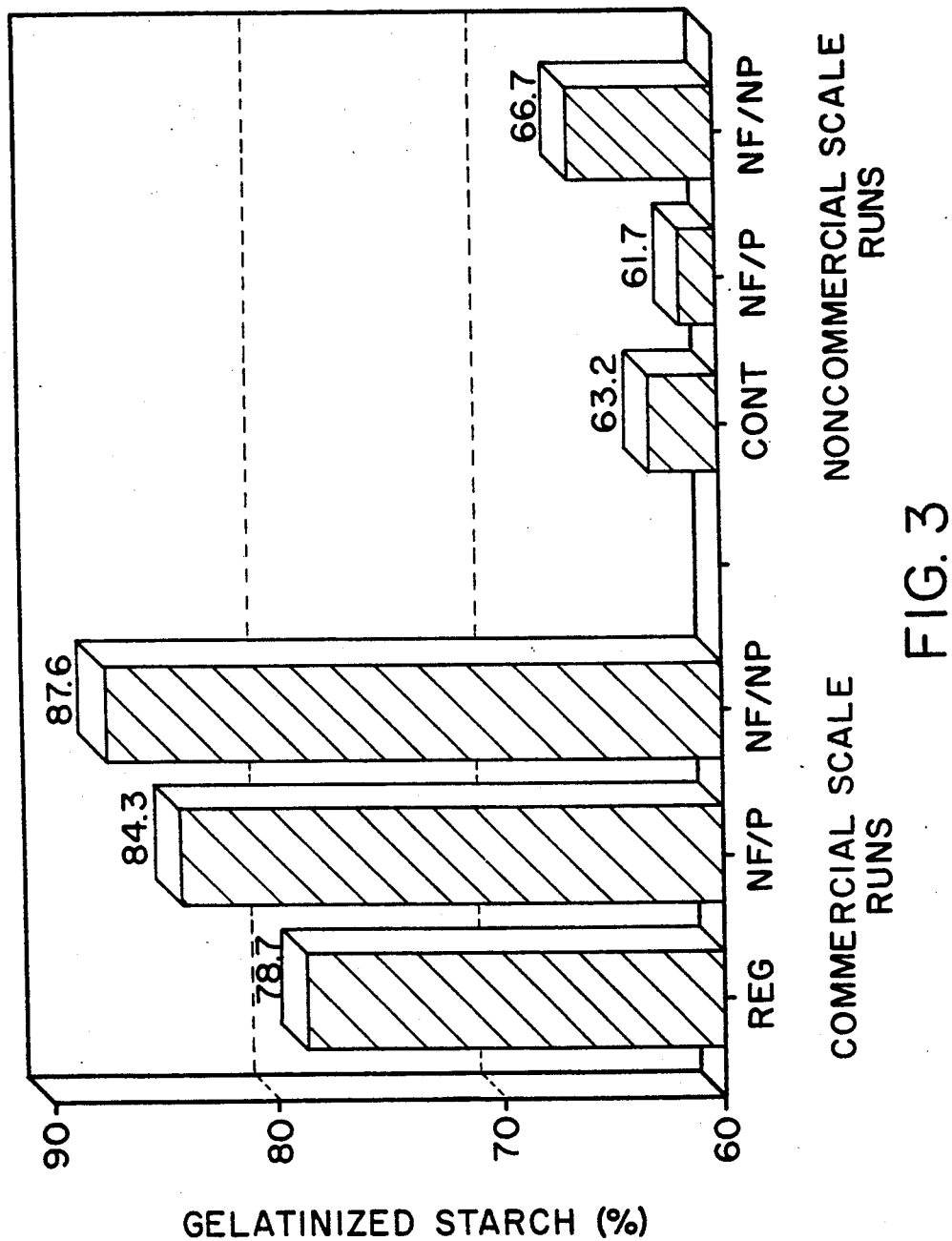
FIG. 3 is a graph of two analyses of average starch gelatinizations for commercial scale fermented cracker production runs (A) and small scale batch fermented cracker runs (B). "Reg." and "Cont" both mean crackers made with fat. "NF/P" means no fat with pentosanase treatment. "NF/NP" means no fat and no enzyme treatment.

Small changes in amount of starch gelatinization in fermented crackers, for example, can make big differences in texture. For example, FIG. 3 shows the average percent gelatinization for commercial scale runs A and pilot plant scale runs B. The control in the commercial scale Runs (A) shows an average of 78.7% gelatinized starch. The control is a regular fat containing cracker. The no fat and no enzyme crackers, NF/NP, had an average of about 87.6% gelatinized starch. The crackers are unacceptable, being hard and brittle. The enzyme treated no fat crackers NF/P had an average 3.3% less gelatinized starch but were acceptable. The samples for both runs had varying amounts of enzymes and water. The data indicates the enzyme treatment diminishes starch gelatinization and 3.3% less gelatinization may be all that is necessary to achieve a commercially acceptable product.

Figure 4:
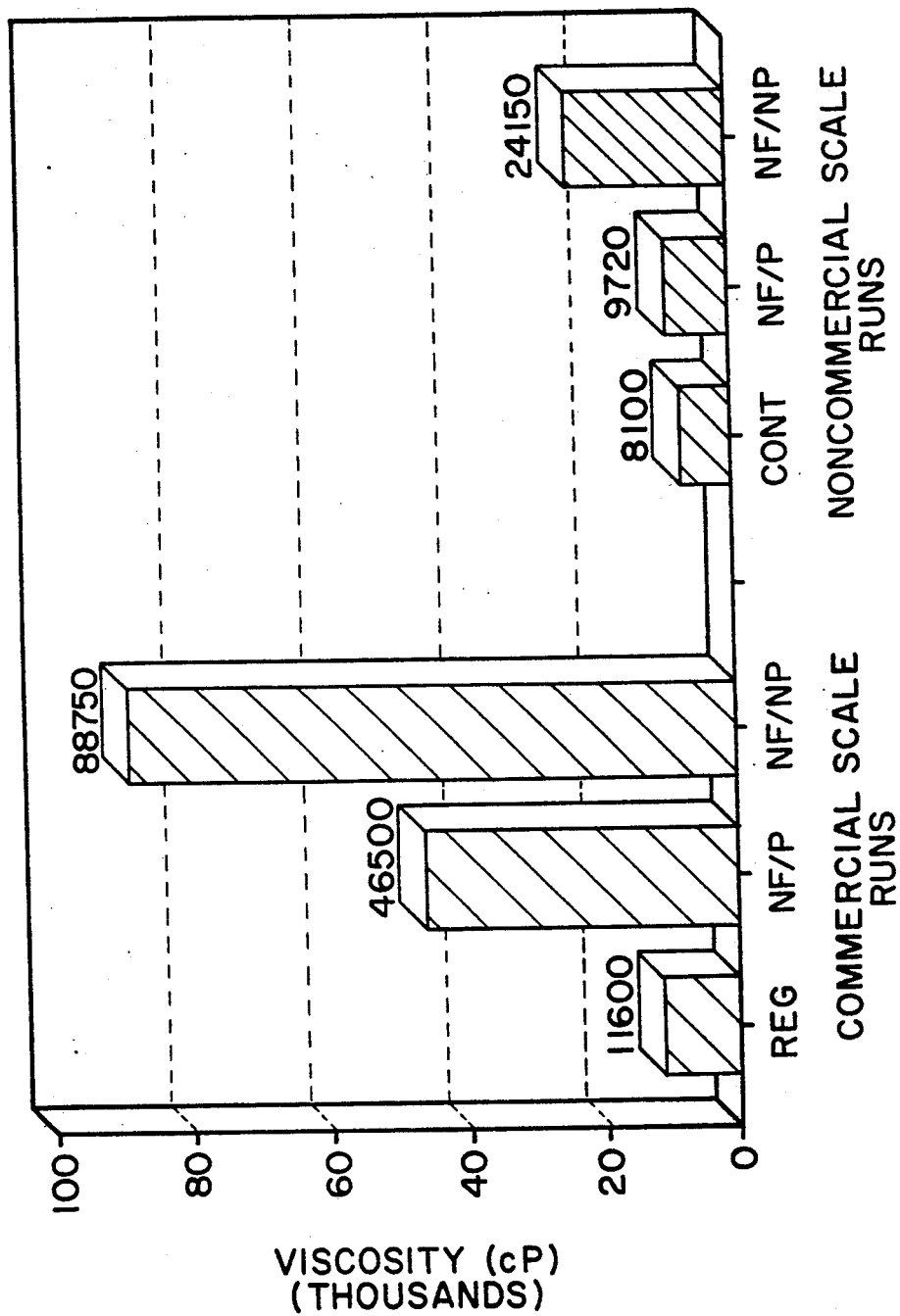
FIG. 4 is a graph which accompanies FIG. 3. The data are obtained from measuring the viscosity of slurries made from the crackers of FIG. 1. The no-fat, pentosanase crackers are closer to the control than the no-fat, no pentosanase crackers.

Also important is starch swelling. FIG. 4 shows that water slurries made from NF/NP crackers have much greater viscosity/water holding capacity than slurries made from NF/P crackers. The data show that the physical state of the starch in NF/P crackers was closer to the controls than were the NF/NP crackers.

Moisture content of the final product is an indication of the effect the enzyme treatment contributes to the releasability of water during baking. FIG. 5 is a representation of fermented cracker moisture content (by Computrac analysis) for two different runs on consecutive days. Crackers 6, 6A and 7 were the only formulations without pentosanase treatment. The data indicates that moisture bake-out is increased by the enzyme treatment. The cracker with the lowest moisture is no. 5 which has the highest level of enzyme, three times the preferred level.

Varying levels of the enzyme can effect texural attributes. FIG. 6 shows the force required to snap the fermented crackers of FIG. 5. A significant finding is that cracker no. 5, the one with the most enzyme treatment, was the most fragile, even more fragile than the non-enzyme treated fat-free crackers. This may be corrected by reducing baking times and/or temperatures.

Starch gelatinization occurs when: a) water in a sufficient amount, generally at least about 30% by weight, based upon the weight of the starch, is added to and mixed with starch and, b) the temperature of the starch is raised to at least about 60° C. (140° F.), preferably 100° C. (212° F.) or more. The gelatinization temperature may depend upon the amount of water available for reaction with the starch. The lower the amount of available water, generally, the higher the gelatinization temperature. Gelatinization may be defined as the collapse (disruption) of molecular orders within the starch granule manifested in irreversible changes in properties such as granular swelling, native crystallite melting, loss of birefringence, and starch solubilization. The point of initial gelatinization and the range over which it occurs is governed by starch concentration, method of observation, granule type, and heterogeneities within the granule population under observation. Pasting is the phenomenon following gelatinization in the dissolution of starch. It involves granular swelling, exudation of molecular components from the granule, and eventually, total disruption of the granules. See Atwell et al., "The Terminology Associated With Basic Starch Phenomenon," *Cereal Foods World*, Vol. 33, No. 3, Pgs. 306–311 (March 1988).

In the present invention, excessive starch gelatinization is avoided to obtain a long lasting, tender, non-brittle texture in mass produced crackers which contain reduced fat levels. The shelf-stable texture lasts for at least two months, preferably at least about six months when the products are packaged in closed containers. Added fat or shortening may be reduced by at least one third, preferably by at least one half. Most preferably added fat or shortening is entirely eliminated.

In the present invention, the added fat or shortening content of a cracker is reduced while both substantially maintaining its desirable texture and the machinability of the dough from which it is baked. This is accomplished by admixing flour, water, and an enzyme composition having activities which hydrolyze non-cellulosic cell wall polysaccharides such as the pentosans of wheat or rye flour and the beta-glucans of oat or barley flour. The enzymatic treatment by the pentosanase and the amount of water used are such so as to avoid excessive starch gelatinization upon baking and are such as to obtain a dough which is machinable on a mass production scale. It is preferred to achieve substantially the same viscosity or consistency and substantially the same viscosity or consistency and substantially the same degree of starch gelatinization as in the cracker from which the added fat is removed.

In the present invention, a reduction in machinability caused by reduced fat or shortening levels may be compensated for by increasing the amount of water to reduce dough viscosity without excessive starch gelatinization. Preferably, minimal amounts of water are used to form the dough so as to reduce starch gelatinization. Thus, most preferably the water content of the dough is the same as that of the machinable cracker dough prior to replacing its shortening or fat. Generally, the amount of water may be increased by up to about 17% by weight, preferably from about 5% by weight to obtain a machinable dough.

The machinable fat reduced doughs of the present invention are continuously sheetable using counter-rotating rolls. The dough sheet can be continuously laminated upon itself to form 3 to 8 laminae, for example. The laminated doughs are capable of being reduced in thickness by counter-rotating rolls to obtain a sheet which may be cut into pieces by reciprocating or rotary cutters, for example. Plastic cutters, such as nylon or polycarbonate cutters, or plastic coated steel cutters, such as teflon coated steel cutters may be used to reduce dough adherence. Conventional cracker manufacturing equipment such as gauge rollers, laminators, and cutters may be used in the present invention.

The machinable, reduced fat or shortening content doughs of the present invention may have an LFRA value of about 100 grams to about 1200 grams, preferably from about 400 grams to about 600 grams. LFRA is an acronym for Leatherhead Food Research Association, the manufacturer of a texture analyzer. As used herein, it is the resistance to deformation of the dough to a 0.5" diameter ball probe moving at the constant rate of 2 millimeters per second for a set distance of 15 millimeters into the dough.

The enzymatic treatment is conducted to hydrolyze non-cellulosic cell wall polysaccharides. Replacing added fat or shortening used in preparing a machinable dough with enzyme composition and water may increase the viscosity of the dough provided the resulting viscosity is within a machinable range.

The enzymes may be used at temperatures and pH conditions normally recommended by their manufacturers or at conditions which are optimal for pentosanase or other hemi-cellulase activities. The enzymes may be acidic, neutral, or alkaline. Preferred commercially available enzyme preparations which may be used in the present invention are Multifect XL and Cytolase 123 (also known as GC123), manufactured by Genencor, Inc., 180 Kimball Way, South San Francisco, Calif. 94080. The latter is described in their literature as a cellulase from the microorganism *Trichoderma reesei* which possesses powerful pentosan degrading activity. It is believed to comprise endo-celllulase, beta-glucanase, pentosanase, and beta-glucosidase. According to the Genencor literature, when evaluating GC123 in cereal grain applications the enzyme should be added at about 0.2 percent w/w based on grain. It is indicated that in many applications this dosage can be substantially reduced. It is further indicated that optimal operating pH for the important activities in GC123 are generally centered around pH 4.8. It is indicated that considerable flexibility does exist. Typically, it is reported, pH adjustment is not required when treating cereal grains suspended in tap water (pH approximately 6.2). According to the literature, optimal activity is generally found at about 50° to 60° C. The enzymes, it is stated, are active at lower temperatures, but work less quickly. Higher temperatures (to approximately 70° C.) may be used for short incubation times but the activity is soon lost due to thermal inactivation. The enzyme may be added in liquid or powdered form. Preferably, the enzyme composition used in the present invention is presented in solution amounting to about 0.1% of the weight of the flour.

The pentosanase content of hemi-cellulase enzymes is preferably measured as xylanase units of activity. The assay principle is this: xylanase activity is determined with a simple colorimetric assay. A commercially available soluble, dyed xylan is hydrolyzed and the small molecular weight fragments are not precipitated by ethanol leaving a colored supernatant.

Enzymes have optimal environments in which they function best. Care should be taken with enzyme treatment to create a suitable environment for the enzyme. The pH of the leavening agents is high so they preferably should not be admixed with the enzyme in a concentrated manner. For example, in producing an unfermented cracker the leavening agent is preferably well dispersed with the other ingredients prior to the addition of the enzyme.

The farinaceous materials which may be subjected to the enzymatic treatment in accordance with the present invention include bleached or unbleached flour, flour fractions, and mixtures thereof, starch, such as corn starch, wheat starch, rice starch, potato starch, tapioca starch, and mixtures thereof.

The flour which may be used in the present invention includes wheat, corn, rice, barley, rye, oat potato, tapioca, graham, and mixtures thereof. The preferred flours for making the baked comestibles of the present invention are wheat flours and mixtures thereof with one or more other flour type, such as oat, rice or barley flour.

FAT-FREE FERMENTED CRACKERS

Fat-free fermented crackers are produced using a sponge stage and a dough-up stage. The basic ingredients in the preparation of a sponge are flour and water. The fermentation agents are yeast and bacteria. The yeast, flour, and the surfaces of the trough in which the sponge is formed can serve as sources of microflora. It is preferable to use a starter or inoculum from a previous batch of sponge to serve as a source of yeast and bacteria. A sponge flour is typically relatively strong, unbleached, with an ash of 0.39 to 0.42%. It typically has a protein content of about 7.5 to 13.0% and an acid viscosity value in the range of about 60° to 90° M. A typical sponge is produced by combining the flour, water, yeast, and bacterial source in a mixer, such as a spindle mixer.

It is preferable to add all of the water in the sponge-forming stage to avoid an extra step in the dough forming stage. A portion may be added to the sponge in the dough-forming stage in a manner which avoids disturbing the substantially uniform distribution of the leavening agents.

Exemplary relative amounts of the ingredients which may be used in the formation of the sponge are from about 60 to about 70% by weight flour, from about 25% by weight to about 35% by weight water, from about 0.1 to about 1% by weight yeast, from 0 to 1% by weight diastatic malt or proteolytic enzyme, from about 0 to about 1% by weight yeast food, and from about 0 to about 2% by weight of starter or ferment. All percentages are based upon the total weight of the ingredients used to form the sponge. Known buffers can be added as needed to obtain a pH of about 5 to about 6.5 at the start of the fermentation. Various flours can be used, such as wheat, oat, rice, graham and mixtures thereof, but wheat flour or mixtures thereof with one or more other flours are preferred.

Fermentation times (also referred to herein as sponge times) are those conventionally used in the art. In the case of soda crackers or saltines, and the many variants of these products such as oyster (soup) crackers, club crackers, cheese crackers, and the like, sponge times of about 2 to about 24 hours, are typically used.

In preparing the sponge, no special order of mixing is required. Conventional processes can be used. Typically, the flour is dumped into a trough, a portion of the water containing dispersed yeast and buffer is added, the remaining ingredients of the sponge are added, and then the balance of water is added. The sponge ingredients are mixed until substantial homogeneity is achieved.

When doughing up the sponge, typical dough ingredients for mixing into the fermented sponge include flour and sodium carbonate. The addition of a minor amount of water, salt or sodium chloride, ammonium bicarbonate or calcium carbonate in the dough-up stage is typical. The calcium carbonate is added for the nutritive value of the calcium. It is preferable to include all of the water as an ingredient of the sponge. The dough flour may generally be weaker than the sponge flour, typically with an ash of about 0.04%, and an acid viscosity reading of about 55° to 60° M. Wheat flour and mixtures thereof with at least one other flour are preferred.

The relative amounts of the total amount of sponge ingredients to the dough ingredients should be such that the weight percent of flour used to form the sponge is from about 60% to about 75% by weight of the total amount of flour which is used.

Hemicellulases may be added during sponge preparation, during sponge fermentation, or at a later time. However, adding the hemicellulase at dough-up is preferred to avoid the possibility of interference with the sponge fermentation process. For example, pentosanase is preferably added to the surface of the sponge in a solution for even dispersion. Flour should then preferably be added followed by the leavening agents. When, for example, pentosanases which work best at pH's of about 4.5 or 5 are used, alkaline leavening agents e.g., sodium bicarbonate, preferably should be maintained separate from the pentosanases as long as possible to obtain consistently good results.

The dough ingredients and the sponge are then mixed to obtain a dough of substantial homogeneity. After mixing, the dough is proofed, or allowed to ferment, as is conventional in the cracker art. The viscosity of the dough is also decreasing during this time. Typical proofing times range from about 3 hours to about 5 hours, most typically about four hours. Generally, the temperature of the sponge before doughing, the temperature of the dough after doughing, and the temperature of the dough at the dough forming machine are substantially the same. The viscosity of the dough after proofing should be in the machinable range having an LFRA value of about 100 to about 1200 grams, preferably from about 400 to about 600 grams.

The proofed dough is machined and baked in the conventional manner for the preparation of fermented crackers. Soda crackers, for example, are formed from a continuous sheet of dough which is laminated or lapped before being cut. The dough pieces are formed by a stamping device, such as a reciprocating cutter or rotary cutter, which does not entirely sever the individual crackers from the sheet. The crackers remain in a substantially continuous sheet through the band oven. The cutter also punctures the dough pieces to form docking holes for the prevention of uneven or excess expansion in the oven. After baking, the individual crackers are separated from the substantially continuous sheet. The optional topping salt is generally applied after stamping and before baking.

The baked product is typically dried during the baking step or in a subsequent drying step to a moisture content of about 2% to about 4% by weight, based upon the final weight of the cracker.

A problem may arise with the shelf life of such fat-free crackers. They can go rancid more rapidly than crackers made with fat. This is because fat or shortening retards oxygenation and peroxide formation at points of unsaturation in naturally occuring grain lipids. Thus, "fat-free" does not mean absolutely no fat; rather, it means no fat is added. Lipids are naturally present in grains such as wheat and wheat products such as flour. It is these lipids which can go rancid when fat-free crackers are made. At some point in the process an antioxidizing agent such as naturally occurring anti-oxidants including citric acid or vitamin E, or BHT, BHA or TBHQ or mixtures thereof, can be added to prevent rancidity.

The following example illustrates how the invention can be practiced with a fermented cracker system.

EXAMPLE I

This example illustrates the use of pentosanase in producing a fat-free fermented cracker dough. A sponge was prepared from the following ingredients:

| Ingredients | Parts by Weight |
| --- | --- |
| Wheat flour (about 12% by weight water) | 64 |
| Yeast | 0.1 |
| Starter solution (protease and previous batch starter) | 1 |
| Water | 32 |
| TOTAL | 97.1 |

The sponge was formed by dumping the flour into the trough. The remaining ingredients were added to a mixing tank and blended, then added to the flour in the trough. The mixture in the trough was blended with a spindle mixer, covered and fermented in the trough for 19 hours.

Following this 19 hour fermentation, dough-up of the sponge was effected with the following ingredients:

| Ingredients | Parts by Weight |
| --- | --- |
| Wheat flour (about 12% by weight water) | 36 |
| Liquid xylanase | 0.1 |
| Minor ingredients (salt and minor leavening agents) | 2.2 |
| TOTAL | 38.3 |

The xylanase was added to the top of the sponge, then the dough-up flour was added on top of this. The source of xylanase used was cytolase 123. The amount which was added was about 207 XAU/lb flour based on the manufacturer's colorimetric method as previously described for determining that activity. (XAU means xylanase activity units.) The salt was added, then the other ingredients. The dough was mixed, then proofed for 2-4 hours. The proofed dough was then laminated and cut, and the crackers baked.

FAT-FREE UNFERMENTED PRODUCTS

In preparing unfermented crackers by the method of the present invention, the ingredients used are basically the same as when preparing fermented crackers except that no yeast or bacteria is employed. Thus, the ingredients of the dough may comprise flour, water, sodium carbonate and a food grade acidic compound to effect leavening. The flour used in unfermented crackers does not generally need to be as strong as the sponge flour used in fermented crackers, although the flour should be moderately strong. Advantageously, the dough used to prepare the unfermented crackers comprises malt.

In addition to the aforementioned ingredients, doughs used to prepare unfermented crackers of the snack type by the method of the present invention may contain one or more sugar. For example, the sugar may be added as a mixture of sucrose and high fructose corn syrup, in amounts per 100 parts by weight of flour in the dough, of from about 4 to about 12 parts by weight of sucrose and from about 1 to about 5 parts by weight of high fructose corn syrup.

When producing unfermented crackers by the method of the present invention, the conventional mixing steps of a creaming stage followed by a dough-up stage may be employed. In the creaming stage, all the ingredients may, for example, be creamed except for the wheat flour, liquid pentosanase, and a portion of the water. In the dough-up stage, the flour may be added followed by the pentosanase being added on top. To ensure uniform distribution of the minor ingredients throughout the dough, the flour added in the dough-up stage is preferably distributed substantially uniformly over the surface of the mixture formed in the creaming stage with the minor ingredients distributed uniformly throughout the dough. The dough is typically proofed for about 0.5 to 4.0 hours, although longer and shorter times are possible. The LFRA of the proofed dough should be about 100 to about 1200 grams, preferably from about 400 grams to about 600 grams. The dough is then sheeted, optionally laminated, then cut and baked.

The following is an example of a fat-free, chemically leavened, unfermented cracker, produced using a pentosanase enzyme composition.

EXAMPLE II

This Example illustrates the addition of xylanase in a no-fat unfermented cracker dough. A dough was prepared from the following ingredients:

| Ingredients | Parts by weight |
| --- | --- |
| Wheat flour (about 12 w/o water) | 100 |
| Sugar and High Fructose Corn Syrup | 9 |
| Liquid xylanase (as in Example I) | 0.1 |
| Other (meal, salt, color, etc) | 6 |
| Water | 36 |
| TOTAL | 151.3 |

The dough was formed by first creaming all the ingredients (except the wheat flour, liquid xylanase and a portion of the water). The flour was added, then the liquid xylanase (dispersed in a portion of the water) was added on top. The total was mixed, then proofed. The proofed dough was then sheeted, laminated, cut, and baked.

REDUCTION IN PENTOSAN MOLECULAR WEIGHT

The inventors have characterized the pentosans in fat-free fermented crackers made in accordance with the invention. Extraction and purification of the pentosans was from random samples of regular (added fat) production fermented crackers and fat-free, enzyme treated production fermented crackers. Extraction yields from both cracker samples were approximately 0.9%. Size exclusion chromatography with on-line detectors for refractive index (concentration), light scattering (molecular weight) and viscosity (intrinsic viscosity) was performed.

The protocol for the extraction was:
Water extracts from crackers were centrifuged and filtered, then treated with glucoamylase and pullulanase to remove residual starch. The non-starch polysaccharides were precipitated with ethanol and then redissolved in water. Precipitation and dissolution were repeated, residual ethanol removed by rotary evaporation and the solution then was lyophilized. Percent yield was determined by taking the weight of the material divided by the weight of the cracker multiplied by 100.

The shaded areas in FIG. 7A show that significantly less of the high molecular weight component of the pentosans (30,000–600,000 daltons; intrinsic viscosity 0.6–4.0 dl/g) was present in fat-free crackers than in regular crackers. This comparison exemplifies the effect of the pentosanase treatment.

Crackers made according to the inventive steps will be expected to exhibit a fraction profile similar to that of the graph of FIG. 7B. They will have amounts of gelatinized starch which are less than that of fat-free crackers made without pentosanase treatment. They will generate slurry viscosities approaching of fat laden crackers and much less than that of fat-free crackers made without pentosanase treatment. These are expected to be healthier crackers to eat because they will reduce overall consumption of fat.

What we claim as our invention is:

1. A method for reducing the added fat or shortening content of a cracker while substantially maintaining its desireable texture comprising replacing added fat or shortening used in preparing a machinable dough by admixing flour, water, and an enzyme composition that hydrolyzes non-cellulosic cell wall polysaccharides to obtain a dough wherein the enzymatic treatment by said composition and the amount of water are such so as to avoid excessive starch gelatinization upon baking the dough whereby a tender non-brittle texture is obtained, the water content of the dough being the same or increased without substantially decreasing the viscosity of the dough.

2. A method as claimed in claim 1 wherein the amount of water is increased to reduce dough viscosity to compensate for a reduction in machinability caused by the reduced fat or shortening levels.

3. A method as claimed in claim 1 wherein the added fat or shortening content is reduced by at least one third.

4. A method as claimed in claim 1 wherein the dough contains no added fat.

5. A method as claimed in claim 1 wherein the enzyme composition comprises pentosanase, beta-glucanase, or mixtures thereof.

6. A method as claimed in claim 1 wherein said dough is continuously formed into a sheet by counter-rotating rolls.

7. A method as claimed in claim 4 wherein said dough is continuously formed into a sheet by counter-rotating rolls, the sheet is continuously laminated upon itself to form a laminate, the laminate is continuously reduced in thickness by counter rotating rolls to obtain a laminated sheet, and the laminated sheet is cut into pieces.

8. A method as claimed in claim 4 wherein the dough has an LFRA value in the range of about 100 to about 1200 grams.

9. A method as claimed in claim 5 wherein the amount of water is increased by up to about 17% by weight to reduce dough viscosity to compensate for a reduction in machinability caused by the reduced fat or shortening levels.

10. A method as claimed in claim 5 wherein:

a. a portion of the flour and a portion of the water are admixed with yeast and a starter solution to form a fermented sponge,
b. a solution of pentosanase is placed on top of the fermented sponge,
c. flour is placed on top of the solution of pentosanase,
d. at least one leavening agent is placed on top of the flour,
e. the sponge, flour, pentosanase and leavening agents are admixed to obtain a dough,
f. the dough is proofed, and
g. the proofed dough is formed into pieces, and baked.

11. A method as claimed in claim 10 wherein the proofed dough is sheeted and laminated and then formed into pieces.

12. A method as claimed in claim 10 wherein the proofed dough has an LFRA value in the range of about 100 to about 1200.

13. A method as claimed in claim 10 further comprising the step of preventing rancidity development in the cracker by admixing with the dough an antioxidizing agent to protect points of unsaturation in any fat naturally occurring in the flour.

14. A method as claimed in claim 13 wherein the antioxidizing agent is selected from the group consisting of naturally occurring antioxidants, BHT, BHA, TBHQ, and mixtures thereof.

15. A method as claimed in claim 1 wherein:
a. a fermented sponge comprising flour, yeast, starter solution and water is prepared in the absence of any added fat or shortening,
b. a dough is prepared by admixing with the fermented sponge pentosanase, flour and at least one leavening agent, in the absence of any added fat or shortening, and
c. the dough is proofed whereby a machinable fermented cracker dough is provided.

16. The method of claim 15 wherein the step of proofing the dough obtains a cracker dough having an LFRA value in the range of about 400 to about 600.

17. The method of claim 15 where the step of admixing further comprises the step of controlling the environment for enzyme activity by placing a solution of pentosanase on top of the fermented sponge, followed by placing the flour on top of the solution of pentosanase, followed by placing at least one leavening agent on top of the flour, whereby the pentosanase is protected from the leavening agent.

18. The method of claim 17 further comprising the step of preventing rancidity by adding an antioxidizing agent to the flour to protect points of unsaturation in any fat naturally occurring in the flour.

19. The method of claim 18 wherein the antioxidizing agent is at least one member selected from the group consisting of naturally occurring antioxidants, BHT, BHA and TBHQ.

20. A method for reducing the added fat or shortening content of a fermented cracker comprising replacing added fat or shortening used in preparing a machinable dough with water and an enzyme composition that hydrolyzes non-cellulosic cell wall polysaccharides, wherein the water content of the dough is the same or increased without substantially decreasing the viscosity of the dough.

21. A method as claimed in claim 20 wherein the viscosity of the dough is increased by the replacement.

22. A method as claimed in claim 20 wherein the added fat or shortening is completely replaced.

23. A method as claimed in claim 22 wherein the dough is continuously formed into a sheet by counter-rotating rolls and the sheet is continuously laminated upon itself.

24. A method as claimed in claim 20 wherein the gelatinization of the starch is not substantially increased by the replacement whereby a tender, non-brittle texture is achieved upon baking.

25. A method as claimed in claim 20 wherein the enzyme composition comprises pentosanase.

26. A method as claimed in claim 20 wherein the enzyme composition comprises beta-glucanase.

27. A method as claimed in claim 24 wherein the cracker is prepared from a sponge and the pentosanase is added during sponge preparation or during sponge fermentation.

28. A method as claimed in claim 25 wherein the cracker is prepared using a sponge stage and dough-up stage and the water is added in the sponge stage.

29. A method as claimed in claim 28 wherein the dough is sheeted, laminated, and then cut with a plastic, or plastic coated cutter.

30. A method as claimed in claim 27 wherein the amount of water is increased by about 5% to about 15% by weight.

* * * * *